Figure 1:
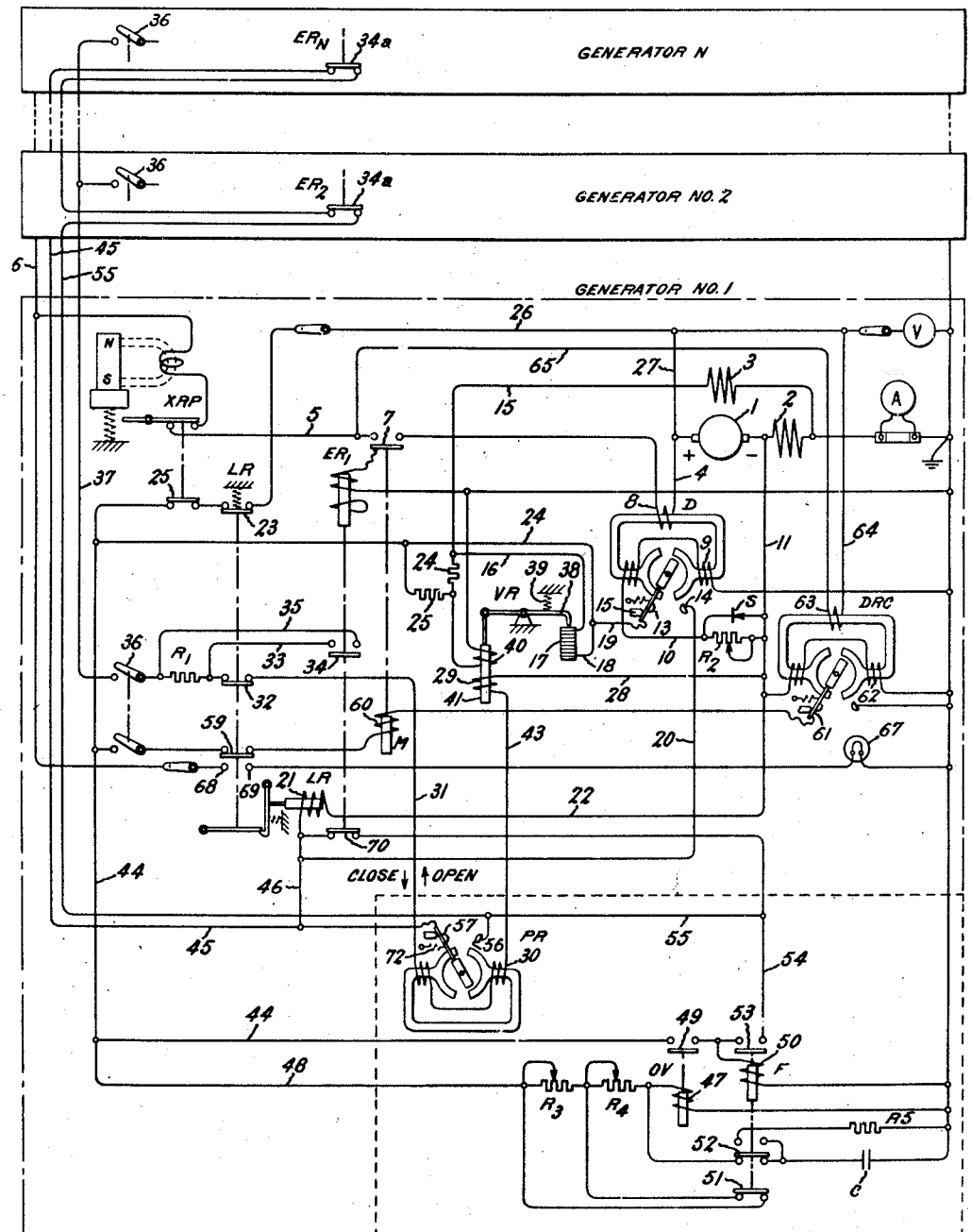

Sept. 27, 1949.  G. W. ALMASSY  2,483,117
PROTECTIVE ARRANGEMENT FOR ELECTRIC POWER SYSTEMS
Filed April 21, 1948  2 Sheets-Sheet 1

Inventor:
George W. Almassy,
by Ernest C. Britton
His Attorney.

Patented Sept. 27, 1949

2,483,117

UNITED STATES PATENT OFFICE 2,483,117

PROTECTIVE ARRANGEMENT FOR ELECTRIC POWER SYSTEMS

George W. Almassy, Burbank, Calif., assignor to General Electric Company, a corporation of New York Application April 21, 1948, Serial No. 22,357

8 Claims. (Cl. 171—312)

1

This invention relates to protective arrangements for electric power systems and more particularly to protective means for direct current power systems utilizing a plurality of generators for use primarily on aircraft, surface ships and the like.

In electric power systems, such for example as are used on multi-engine aircraft, wide variations in the speeds of the different motor-driven generators frequently occur due to the operation of one or more of the aircraft motors at relatively high speeds while one or more motors may be operating at relatively low speeds. For instance, when the aircraft is being taxied, the pilot may operate the port engines at high speed and the starboard engines at low speed or vice versa to aid in turning the aircraft. Even though the various engines, to each of which is connected an electric generator, may vary widely in speed with respect to each other, it is essential that normal system voltage be maintained and that the power system be protected against short circuits occurring throughout the entire system. More specifically, it is essential that protection be provided against excessive currents and that a particular one or more generators, which for any reason, may be generating an excessive voltage, be promptly removed from the system without disturbing the normal operation of the other generators and that the system be protected against any tendency which it may have to operate at a voltage substantially less than the normal rated voltage of the system due to under voltage generated by one or more generators.

Furthermore, the increased use of electricity aboard airplanes and the corresponding increase in the capacity of generating systems for aircraft makes essential a very high degree of adaptability, reliability and safety.

Accordingly, an object of my invention is the provision of means for sensing excessive system voltage or other improper system condition and, in addition, to provide means for selecting the particular generator or generators responsible for such excessive voltage or improper condition which operate promptly to relieve the system of such generator or generators.

Another object of my invention is to provide means for protecting power systems of the type referred to above against very low voltage due to the operation of one or more generators at greatly reduced speed or because one or more generators is out of service altogether by providing means tending to sustain the system voltage.

2

Further objects and advantages of my invention will become apparent as the following description proceeds and the features of novelty which characterize my invention will be pointed out with particularity in the claims annexed to and forming a part of this specification.

Figure 2:
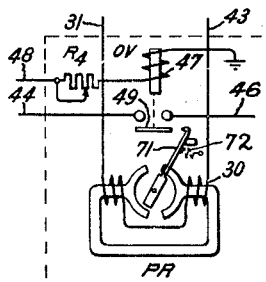
Figure 3:
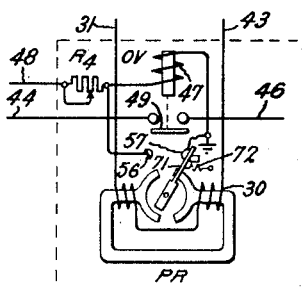

For a better understanding of my invention, reference may be had to the accompanying drawings in which Fig. 1 is a schematic representation of a multi-generator power system showing in detail the connections for one generator, designated as generator No. 1, but not showing in detail the connections for the other generators, designated as generator No. 2 and generator N. It will be understood that the circuits for all the generators are identical. Where reference is made hereinafter to a specific part of a circuit associated with a generator other than generator No. 1, such part will be designated by reference numerals corresponding to the numerals shown in connection with the circuit of generator No. 1. Figures 2 and 3 are schematic representations of a portion only of a system similar to that shown in Fig. 1 which represent alternative modifications of my invention. The various devices are shown in Figs. 1, 2, and 3 with their contacts in the positions which they occupy when the system is not energized.

In Fig. 1 the numeral 1 has been used to designate the armature of generator No. 1 which has a commutating and compensating field 2 and a shunt field 3. The armature 1 is connected through line 4, bridging member 7 of the main contactor M, line 5 and the reverse current circuit breaker designated as XRP to the system power bus 6.

When coil 60 of contactor M is energized such as by manually closing switch 36, bridging member 7 is elevated and interconnects lines 4 and 5 thereby connecting the armature of the generator to the bus 6 through the coil and contacts of circuit breaker XRP.

For the purpose of preventing the connection of a particular generator to the system unless its generated voltage is slightly higher than the system voltage, the polarized relay DRC is used. Relay DRC is provided with a coil 62, which is responsive to the voltage across the commutating and compensating field windings 2, and a coil 63 which is responsive to the difference in voltage between the generator and the main bus. More specifically, coil 62 is connected to ground potential on one side and to a point intermediate the armature 1 and the commutating and compensating field windings 2 through line 11, while coil 63 is connected to the positive side of the generator through the line 64 and to the system side of the bridging member 7 of contactor M through the line 65. Coil 63 exerts a contact closing force on the relay DRC when the generator voltage is greater than the bus voltage, while the coil 62 exerts a contact opening force on the relay DRC when a reverse current, that is, from the bus to the generator, flows through the commutating and compensating field. These coils are so constructed and arranged that they will prevent closing of the bridging member 61 of the relay DRC, unless the system voltage is slightly lower than the voltage generated by the particular generator. It has been found desirable to construct the relay DRC to close its contacts when the voltage generated by the particular generator is approximately one-half volt in excess of the system voltage. By this arrangement, premature connection of the generators to the system is prevented and the generators are removed from the system before they are damaged in the event of normal reduction or loss of voltage, due, for instance, to reduction of speed or shutting down of an engine. The possibility of false operation of the various other protective devices such as the circuit breaker XRP is also excluded, as will be more fully understood as the description proceeds.

The circuit breaker XRP is shown schematically as being of the polarized type and as such will maintain its contacts in the closed position for currents flowing from the armature 1 toward the bus 6 but will operate to open its contacts should current flow from the bus 6 toward the armature 1, such as would occur, for instance, should a fault develop to ground along the feeder lines 4 and 5 or in the armature 1. The time-current characteristic of the circuit breaker XRP as compared with that of the relay DRC and contactor M is such that it will open before contactor M only on large reverse currents such as occur on a ground fault. It will be observed that the circuit breaker XRP, in addition to serving as a protective means responsive to reverse current flow, is also capable of providing backup protection for the main contactor M comprising the bridging member 7 and would protect the system should the bridging member 7 become welded closed or fail to operate for any other reason when the voltage of the main bus 6 exceeds that generated by a particular generator.

For the purpose of protecting each generator and its feeder line 4 against high resistance faults occurring therein, there is provided a differential relay D having two coils, one of which is interposed in the line 4 and the other of which senses voltage across the commutating and compensating winding 2. Coil 9 of relay D is connected through line 10, rectifier S, resistor $R_2$ in parallel therewith, and line 11 to a point intermediate the armature 1 and the commutating and compensating field 2. The other side of coil 9 of differential relay D is connected through line 12 to the grounded side of the commutating and compensating field 2. Thus, it will be observed that coil 9 of differential relay D is responsive to voltage across the commutating and compensating field 2. Coil 8 of differential relay D is responsive to current flowing in the feeder line 4 and normally biases the contact 13 of relay D toward the open position of engagement with the fixed stop 15 of relay D. Coil 9, which is responsive to commutating and compensating field voltage, biases the contact 13 of the differential relay D toward the closed position of engagement with the fixed contact 14 of the relay D. Under normal conditions the current through line 4 and coil 8 will be sufficient to maintain the contacts 13 and 14 open against the bias of coil 9. Should a fault occur, however, in line 4 or within the generator armature 1, the current through coil 8 would be insufficient to maintain the contacts 13 and 14 in the open position and these contacts would close under the action of coil 9. During transient reverse currents, the action of coils 8 and 9 is reversed and it would be possible for the current in coil 8 to close the contacts 13 and 14 by overcoming the action of coil 9, therefore, rectifier S is used to by-pass resistor $R_2$ during such transient reverse currents, thereby increasing the current in coil 9 and preventing closing of contacts 13 and 14. When contacts 13 and 14 are closed, a circuit will be completed from the generator positive terminal through lines 26 and 27, contact 23, contact 25, line 24, flexible lead 19, line 20, coil 21 of the latched relay LR, line 22, and line 11 to the generator armature negative terminal. Flow of current through this circuit will energize coil 21 of the latched relay LR and will cause the contacts thereof to open. When the bridging member 23 of the latched relay moves out of engagement with its cooperating contacts, the circuit to the shunt field 3 will be opened as will be apparent hereinafter and the generator will be rendered incapable of generating appreciable voltage. The above-described arrangement incorporating the relay D is not my invention and is disclosed and claimed in application, Serial No. 21,924, filed April 19, 1948, of Lloyd, assigned to the same assignee as this application.

The circuit for the shunt field 3 comprises lead 15, the series connection between resistors 24 and 25 on the one hand, line 16, the resistance element 17 of the voltage regulator VR, line 18, and line 24 on the other hand, the bridging member 25 of the XRP circuit breaker, the bridging member 23 of the latched relay LR, line 26, and line 27. Thus, it will be apparent that the opening movement of the bridging member 23 of the latched relay LR will effectively open the shunt field 3 which operation is responsive to the differential action of the differential relay D which action causes such relay to close its contacts 13 and 14.

The normal operation of the voltage regulators VR to maintain a predetermined system voltage by controlling the shunt fields of each of the generators is well known in the art. Reduced voltage across the generator armature 1 will result in reduced current through coil 40 of the voltage regulator VR. Such reduced current through coil 40 diminishes its downward pull on the armature 41 of the voltage regulator VR. This reduction of downward pull on the armature 41 increases the downward force exerted by the arm 38 on the resistance 17 due to the action of compression spring 39 and causes an increased current to flow through the shunt field due to a reduction in the resistance 17 by way of the circuit previously described in connection with the differential relay D and thus causes the generator to increase its generated voltage due to the stronger field established by the shunt winding 3. Conversely increased voltage across the armature 1 will result in a reduction of the voltage generated by the generator.

For the purpose of causing the various generators to divide load equally and carry approximately the same current, it is customary to provide means for balancing the various generator currents. More specifically, an equalizing circuit sensitive to current unbalance may be connected between the various generators at some convenient point such as a point intermediate the armature and the commutating and compensating fields. In the system which I have illustrated in the drawing, the various generators are interconnected by an equalizing bus circuit which includes line 11, line 28, equalizer coil 29 of the voltage regulator, line 43, coil 30 of the polarized relay PR, line 31, bridging member 32 of the latched relay LR, line 33, bridging member 34 of relay ER1 which would be in the closed position when the system is energized, line 35, switch arm 36, equalizing bus 37, and circuits identical to the one just described for generator No. 1 which are associated with the other generators.

If a particular generator tends to generate an excessive voltage, an excessive current will be caused to flow through the commutating and compensating fields which will raise the voltage across these fields in the particular generator generating excessive voltage above that of the other generator commutating and compensating fields. This increased voltage will cause a current to flow in the equalizer circuit and voltage regulator equalizer coils in such directions as to raise the voltage of such normally operating generators and to lower the voltage of the generator generating excessive voltage, thereby increasing the current in the normally operating generators and reducing the current in the generator formerly generating excessive voltage. In a similar manner, corrective action is taken if one generator is generating less than normal voltage.

If one or more of the generators is out of service completely or is operating at greatly reduced speed or for any other reason is generating a very low voltage, the above-described operation of the regulator VR will be biased by the equalizer action and will not maintain the system voltage at its normal rated value and such voltage will be subnormal. Therefore, it is desirable to provide means for protecting the system against such very low voltage.

Normally the equalizing winding 29 of the regulator of a particular generator opposes the action of the winding 40 of the regulator of such generator to render the coil 40 less effective in performing its voltage regulating function if current is flowing through the equalizing bus circuit. This action of equalizing coil 29 of the regulators VR, together with the normal action of the equalizing bus, tends to force the various generators to generate at substantially the same voltage and obviously will tend to lower the system voltage considerably when one or more of the generators is generating a very low voltage.

In order to offset this tendency of the coils 29 and of the equalizing circuit to lower considerably the system voltage, I provide means for reducing the current through the coils 29 of the generators which are not defective thereby causing such generators to tend to maintain normal system voltage. More specifically, and assuming that generator No. 1 is generating excessively low voltage so that it is carrying no load, current will flow through the equalizing circuit comprising line 11, line 28, equalizer winding 29 of the voltage regulator VR, line 43, winding 30 of the polarized relay PR, line 31, the bridging member 32 of relay LR, line 33, the bridging member 34 of the ER1 relay, line 35, switch arm 36, equalizing bus 37, from the identical circuits associated with the other generators. The reduced voltage of generator No. 1 will cause it to take reverse current from the main bus which results in the action of relay DRC opening contactor M and removing it from the line. The equalizing circuit to generator No. 1 will not be opened, however, and current in this circuit will tend to lower the voltage of the other generators. Bridging member 7 is no longer energized and relay ER1 armature is lowered opening the bridging member 34, thus removing the short circuit around the resistor R1 associated with the generator No. 1 equalizer circuit. The resistance R1 will cause a reduced current to flow through the above-described equalizing circuit and hence will cause reduced current to flow through coil 29 of voltage regulators VR associated with each generator. This reduced current through coils 29 will be less effective than under more normal conditions to pull downwardly on armatures 41 and will permit the armatures 41 of the voltage regulators VR to move upwardly, which in turn will cause the arms 38 of the voltage regulators to decrease the magnitude of the resistances 17. This reduction of the resistances 17 will increase the flow of current through the shunt fields 3 of each of the generators. In this way, the entire system is protected against the occurrence of excessively low voltage and will tend to maintain a higher voltage more closely approximating rated voltage. Otherwise stated, I have provided means for rendering the equalizing circuit less effective when a particular one or more generators produce an exceptionally low voltage thereby causing the system voltage to approach a value only slightly below the rated system voltage.

For the purpose of relieving the system of a particular one or more generators which for any reason may tend to operate at a voltage higher than the rated voltage of the system, I provide means responsive to the system voltage for detecting the excessive voltage condition as well as means for selecting the particular generator or generators which may be delivering an excessive voltage. For this purpose, I utilize the voltage sensitive relay OV which senses system voltage and operates to close its contacts when such voltage exceeds a predetermined value, and, in addition, I incorporate the polarized relay PR into the equalizing bus circuit for selecting the defective generator by sensing the direction of current flow through the equalizing bus which, of course, will be toward the generator delivering excessive voltage from the generators tending to deliver a lower voltage approximating rated voltage. More specifically, the coil 41 of the OV relay is grounded on one side and is connected to the positive terminal of its associated generator through resistors $R_3$ and $R_4$, through line 48, line 44, bridging member 25 of the XRP relay, bridging member 23 of the LR relay and through lines 26 and 27. Resistance $R_4$ is a calibrating resistor for coil 47 of the OV relay and determines the voltage at which the OV relay picks up. When the OV relays pick up due to an excessive system voltage and elevate their bridging members 49 to the contact closed position, the coil 50 of relay F is energized and picks up to move its bridging member 51 to the open position which inserts resistor $R_3$ in the circuit of the OV relay for the purpose of adjusting the drop-out voltage of the OV relay to a value in excess of normal bus voltage. Operation of relay F changes the position of the double throw bridging member 52 so as to disconnect the capacitor C from its parallel circuit relationship with the coil 47 of the OV relay and, furthermore, short circuits the capacitor C through the resistor $R_5$. Capacitor C provides time delay to prevent false operation of the OV coils when a transient condition exists. Operation of the relay F elevates the bridging member 53 to closed circuit position. It will be understood that the occurrence of an excessive voltage on the system will cause the OV and F relays associated with each of the generators to operate.

A more simple method of preventing false operation of the OV relay due to the occurrence of temporary high voltage transient surges would be to provide the OV relay with a slug in which current would be induced, which current would establish a flux in such a direction as to oppose the build-up of flux in the relay as is well known in the art. It is vital to have the OV relays associated with the generators generating normal voltage to drop out promptly after the defective generator generating abnormal voltage is disconnected from the system in order to avoid disconnecting the normally operating generators. Because a relay provided with a slug would have time-delayed drop-out characteristics as well as time-delayed pick-up characteristics, it is impracticable to utilize a slugged relay in the system shown in Fig. 1. Thus, an arrangement such as that described in connection with Fig. 1 is necessary wherein a capacitor such as C is used to accomplish delayed pick-up and wherein a recalibrating resistor such as $R_3$ is provided to accomplish drop-out above normal system voltage.

As explained above, the coil 30 of the polarized relay PR is in the equalizing bus circuit. Assuming that generator No. 2 is delivering excessive voltage to the system, a current will flow through the equalizing circuit already described toward generator No. 2 from generator No. 1 and toward generator No. 2 from all of the other generators. Thus, with respect to the control circuit of generator No. 1, current will flow in a downward direction in line 43 through the coil 30 of the PR relay upwardly through line 31. Current flowing in this direction will not cause the PR relay associated with generator No. 1 to close its contacts and the contact 57 will not engage the contact 56 of the relay PR associated with generator No. 1. The current in all of the other generators except generator No. 2 will also be in such a direction as to maintain the PR contacts associated with such generators in the open position. The direction of current through the equalizing bus will be such with respect to the defective machine No. 2 as to cause the PR relay associated with such machine to close its contacts and thereby complete a circuit from the system through line 44, bridging member 49 of the OV relay of generator No. 2, bridging member 53 of the F relay associated with generator No. 2, through line 54, line 55, contacts 56 and 57 of the PR relay associated with generator No. 2, through line 46, coil 21 of the LR relay of generator No. 2, line 22, and line 11 to the generator armature negative terminal. Energization of the coil 21 of latched relay LR will cause such relay to operate and to move bridging member 23 to the contact open position thereby opening the circuit between shunt field 3 and the positive terminal of the generator No. 2, which circuit has already been described. When the latched relay LR operates, the double throw bridging member 59 thereof deenergizes the coil 60 of the M relay. When the coil 60 is deenergized, the bridging member 7 thereof opens the circuit between lines 4 and 5 and thereby disconnects the generator armature 1 of generator No. 2 from the system, and this generator is thus completely disconnected from the system while the remaining generators remain unaffected.

For the purpose of providing an indication of the fact that a particular generator has been disconnected from the line, I provide an indicating lamp 67 which is energized when the latched relay LR is opened by the engagement of the bridging member 59 with the terminals 68 and 69.

Even though all the generators except one are disconnected from the system, it is desirable to protect such generator and the system from overvoltage. Assuming that generator No. 1 is the only generator connected to the system, the equalizing bus circuit will be open due to the fact that the switch 36 associated with generator No. 2 and generator N will be open. When the equalizing circuit is open, there will be no current through the coil 30 of the PR relay associated with generator No. 1 and the contacts of this relay may be open or closed under these conditions. Should an overvoltage condition develop and should the contacts of the PR relay of generator No. 1 be open, the coil 21 of the latched relay LR would not be energized even though the OV relays pick up. For this reason, I have provided means for short circuiting the contacts of the PR relay associated with the generator generating excessive voltage when all the other generators are disconnected from the system. More specifically, the lines 45 and 55 are connected across the contacts of the PR relay of generator No. 1 and are connected to each other through the series arranged normally closed bridging members 34a associated with generator No. 2 and generator N. It will be understood that these bridging members 34a will occupy the closed circuit position because relays $ER_2$ and $ER_N$ will not be energized when generator No. 2 and generator N are disconnected from the system. Thus, overvoltage will operate the OV relay of generator No. 1 as already explained, and, because the contacts of PR relay of generator No. 1 are short circuited, the circuit including the latched relay coil 21 will be complete and energization of coil 21 will remove generator No. 1 from the system as already explained. It will be understood that generator No. 2 and generator N are provided with conductors such as 45 and 55 which in turn are connected in series with normally closed contacts 34a of the ER relays associated with each other generator, and which for simplicity are not shown on the drawing, so that if a generator other than generator No. 1 is the only generator connected to the system, such generator will likewise be protected against overvoltage even though the equalizing circuit is open.

It is also desirable to protect a particular generator from overvoltage even though such generator is disconnected from the system as by opening switch 36. For instance, and assuming that generator No. 1 is being rotated but is not connected to the system, the equalizing circuit of the generator will be open due to the fact that the upper blade of switch 36 is in the open position. Consequently, means are provided for short circuiting the PR contacts. More specifically, the bridging member 70 is incorporated in the ER relay and, when generator No. 1, for example, is disconnected, will occupy the closed circuit position. The bridging member 70, lines 46 and 55 short circuit the contacts 56 and 57 of the PR relay. Thus, overvoltage will operate the OV relay of generator No. 1 and, because the PR contacts are short circuited, the circuit including the coil 21 of the latched relay will operate to trip that relay which will remove field excitation from generator No. 1. As explained, each other generator is similarly protected.

Fig. 2 shows an alternative arrangement for the lower right-hand portion of Fig. 1 which is enclosed by dashed lines. By the circuit arrangement shown in Fig. 2, the coil 47 of the OV relay is connected to ground on one side and through an adjustable calibrating resistor R4 to the line 48 on the other side. The resistor R4 is merely for the purpose of adjusting the pick-up voltage of the coil 47. The contacts of the OV relay are connected to the line 44 and the line 46. As will be more fully understood hereinafter, the F relay, the recalibrating resistor R3, the capacitor C and the resistance R5 shown in Fig. 1 are not necessary in the arrangement shown in Fig. 2. The coil 30 of the PR relay is connected as in Fig. 1 to lines 31 and 43. The armature of the PR relay is adapted for being mechanically interlocked with the bridging member 49 of the OV relay. More specifically, the armature of the PR relay is provided with a hooked arm 71 which normally permits upward motion of bridging member 49 of the OV relay. Arm 71 is biased away from engagement with the member 49 by a light tension spring 72. If there is no current through the equalizing circuit comprising coil 30, lines 31 and 43 or, if current is flowing downwardly in line 31 and upwardly in line 43, the arm 71 will remain in the position shown. More specifically, when generator No. 1 is generating overvoltage, current will flow downwardly in line 31 and upwardly in line 43, and arm 71 will remain to the right, as shown, thereby disengaging the member 49 of the OV relay, which will then move upwardly to the closed position due to the overvoltage across coil 47. The circuit to coil 21 of the LR relay will then be complete, and coil 21 will operate to disconnect generator No. 1 from the system as already explained. If, however, generator No. 1 is operating normally and one of the other generators is generating overvoltage, current will flow upwardly in line 31 and arm 71 will swing to the left thereby engaging the bridging member 49 of the OV relay, which cannot then operate, and generator No. 1 will remain connected to the system.

Thus, it will be seen that the arrangement shown in Fig. 2 makes unnecessary the use of the recalibrating resistor R3 because only the OV relay associated with the generator producing excessive voltage is picked up and hence it is not necessary to provide for dropping out the OV relays associated with generators producing normal voltage by a recalibrating resistor such as R3. Because the OV relay may be time delayed for opening to avoid tripping on transients by means of a slug, the capacitor C, the resistor R5, and the F relay are not needed. Because the PR relay of Fig. 3 is not provided with contacts, the circuit comprising lines 45 and 55 and bridging members 34a are not necessary in Fig. 2.

Fig. 3 shows schematically an arrangement very similar to that shown in Fig. 2 which is adapted for incorporation into the circuit of Fig. 1 in the same manner as the arrangement of Fig. 2. By mechanical interlocking means, the OV relay shown in Fig. 2 operates only if current through the coil 30 is in the proper direction as explained above. The circuit of Fig. 3 permits the OV relay to operate only when the current through coil 30 is in the proper direction by electrical interlocking means. More specifically, the coil 47 of the OV relay is in parallel with the normally open contacts 56 and 57 of the PR relay. If current is flowing through coil 30 of the PR relay in such a direction that this relay will close its contacts against the bias of the light tension spring 72, a short circuit around coil 47 will be established. The PR relay associated with a normally operating generator is arranged to close its contacts while PR relays associated with a generator generating excessive voltage will allow their contacts to remain open. Voltage across the coil 47 will cause the OV relay to close its contacts and thereby trip the latched relay LR, as explained above, on a generator producing excessive voltage but not on a normally operating generator. Because the contacts of the PR relay of Fig. 3 open to operate the OV relay, the circuit comprising lines 45 and 55 and the bridging members 34a is not needed in the arrangement of Fig. 3.

In all of the above-described arrangements, the coil 30 of the PR relay is in series with the equalizing coil 29 of the voltage regulator VR; i. e., the coil 30 is connected in the equalizing circuit. It will be understood that coil 30 could be connected in parallel circuit relationship with the coil 29 or could be connected in an altogether separate circuit. For instance, a resistor could be inserted between the ammeter A and the series field 2 of each of the generators and a line could be connected at a point between such resistance and the field 2 at one end thereof and to one side of the coil 30 at the other end thereof for each generator circuit. Also, a line would interconnect the other side of the coil 30 of the PR relay associated with each generator. In this way, any tendency for one or more of the generators to generate excessive voltage would be reflected in a flow of current which together with suitable voltage sensing means could be arranged to operate to disconnect a generator generating excessive voltage from the system.

While I have shown and described particular embodiments of my invention, it will be observed by those skilled in the art that various changes and modifications may be made without departing from my invention in its broader aspects and I, therefore, intend in the appended claims to cover all such changes and modifications as fall within the true spirit and scope of my invention.

What I claim as new and desire to secure by Letters Patent of the United States is:

1. In a power system having a plurality of electric generators adapted for parallel operation and interconnected by an equalizing bus, a protective arrangement comprising voltage responsive means operable upon the occurrence of an excessive system voltage for sensing such voltage, current responsive means operable in response to current flowing in said equalizing bus in a predetermined direction for selecting the one or more of said generators generating excessive voltage, and means operable in response to operation of both said voltage and said current responsive means for disconnecting from the system the one or more of said generators generating excessive voltage.

2. In a power system having a plurality of electric generators adapted for parallel circuit operation and interconnected by an equalizing bus, a protective arrangement comprising, a relay operable in response to a predetermined abnormal voltage on said system for detecting such voltage, a relay operable in response to current flowing in said equalizing bus in a predetermined direction for selecting the one or more of said generators generating excessive voltage, and means operable in response to operation of both said relays for disconnecting from the system the one or more of said generators generating excessive voltage.

3. In a power system having a plurality of electric generators adapted for parallel operation and interconnected by an equalizing bus, a protective arrangement comprising voltage responsive means operable upon the occurrence of an excessive system voltage for sensing such voltage, a polarized relay responsive to current flowing in said equalizing bus for selecting the one or more of said generators generating excessive voltage, and means operable in response to operation of both said voltage responsive means and said polarized relay for disconnecting from the system to one or more of said generators generating excessive voltage.

4. In a power system having a plurality of electric generators adapted for parallel operation and interconnected by an equalizing bus, a protective arrangement comprising a voltage responsive relay operable upon the occurrence of an excessive system voltage for sensing such voltage, a polarized relay responsive to current flowing in said equalizing bus toward the one or more of the generators generating abnormal voltage for selecting the one or more of the generators generating excessive voltage, and means operable in response to operation of both said voltage responsive relay and said polarized relay for opening the shunt field circuit of the generator or generators producing excessive voltage and thereafter for disconnecting from the system the one or more of said generators generating excessive voltage.

5. In a power system having a plurality of electric generators adapted for parallel operation and interconnected by an equalizing bus, a protective arrangement comprising voltage regulating means associated with each generator, voltage responsive means operable upon the occurrence of an excessive system voltage for sensing such voltage, current responsive means operable in response to current flowing in said equalizing bus in a predetermined direction for selecting the one or more of said generators generating excessive voltage, means operable in response to operation of both said voltage and said current responsive means for disconnecting from the system the one or more of said generators generating excessive voltage, and means associated with each of said regulating means and responsive to disconnection of one or more generators from the system due to the generation by such generator or generators of a voltage substantially less than normal system voltage for rendering said regulating means and said equalizing bus less effective in lowering the system voltage.

6. In a power system having a plurality of electric generators adapted for parallel operation, a protective arrangement comprising conducting means interconnecting said generators for conducting a current due to the generation by one or more of said generators of a voltage higher than that generated by the other of said generators, means responsive to the flow of current through said conducting means for selecting the one or more of said generators generating excessive voltage, voltage responsive means operable in response to system voltage in excess of a predetermined value for sensing such voltage, and means operable in response to operation of said means responsive to the flow of current through said conducting means and to operation of said voltage responsive means for disconnecting from the system the one or more of said generators generating excessive voltage.

7. In a power system having a plurality of electric generators adapted for parallel operation, a protective arrangement comprising impedance means in series circuit relationship with each of said generators, conducting means interconnecting the impedance means associated with each of said generators for conducting a current due to the generation by one or more of said generators of a voltage higher than that generated by the other of said generators, means responsive to the flow of current through said conducting means for selecting the one or more of said generators generating excessive voltage, voltage responsive means operable in response to system voltage in excess of a predetermined value for sensing such voltage, and means operable in response to operation of said means responsive to the flow of current through said conducting means and to operation of said voltage responsive means for disconnecting from the system the one or more of said generators generating excessive voltage.

8. In a power system having a plurality of electric generators adapted for parallel operation and interconnected by an equalizing bus, a protective arrangement comprising voltage responsive means for sensing a voltage which is indicative of an excessive system voltage, current responsive means responsive to current flowing in said equalizing bus in a predetermined direction for selecting the one or more of said generators causing said excessive voltage, and means controlled by both said voltage and said current responsive means for effecting a control operation in connection with the one or more of said generators selected by said current responsive means.

GEORGE W. ALMASSY.

No references cited.